March 2, 1937.    H. B. McLAUGHLIN    2,072,645

MIXING VALVE

Original Filed Oct. 9, 1935

INVENTOR
Howard B. McLaughlin
BY Robert L. Kahn
ATTORNEY

Patented Mar. 2, 1937

2,072,645

UNITED STATES PATENT OFFICE 2,072,645

MIXING VALVE

Howard B. McLaughlin, Detroit, Mich.

Application October 9, 1935, Serial No. 44,301
Renewed January 9, 1937

3 Claims. (Cl. 236—12)

This invention relates to mixing valves and more particularly to valves having a thermostatic control over incoming hot and cold water to permit an outflow of water at a substantially constant and predetermined intermediate temperature. Valves of this kind are known but as a rule are complicated and expensive to make.

An object of this invention is to devise a valve which will be simple, have few surfaces to be machined, will be positive in operation, have its thermostatic element readily replaceable and be capable of use with various pressures without any adjustment.

Figure 2:
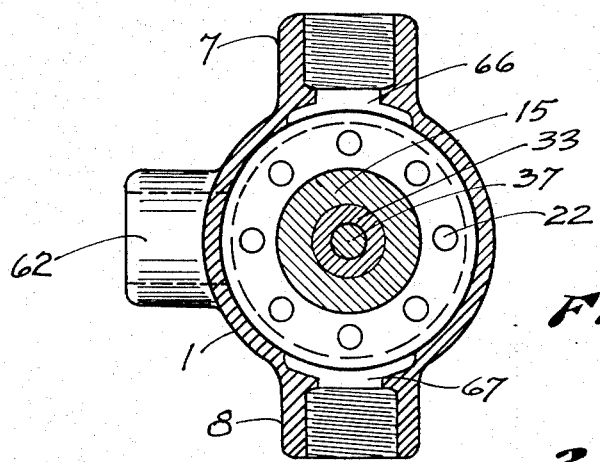
Figure 1:
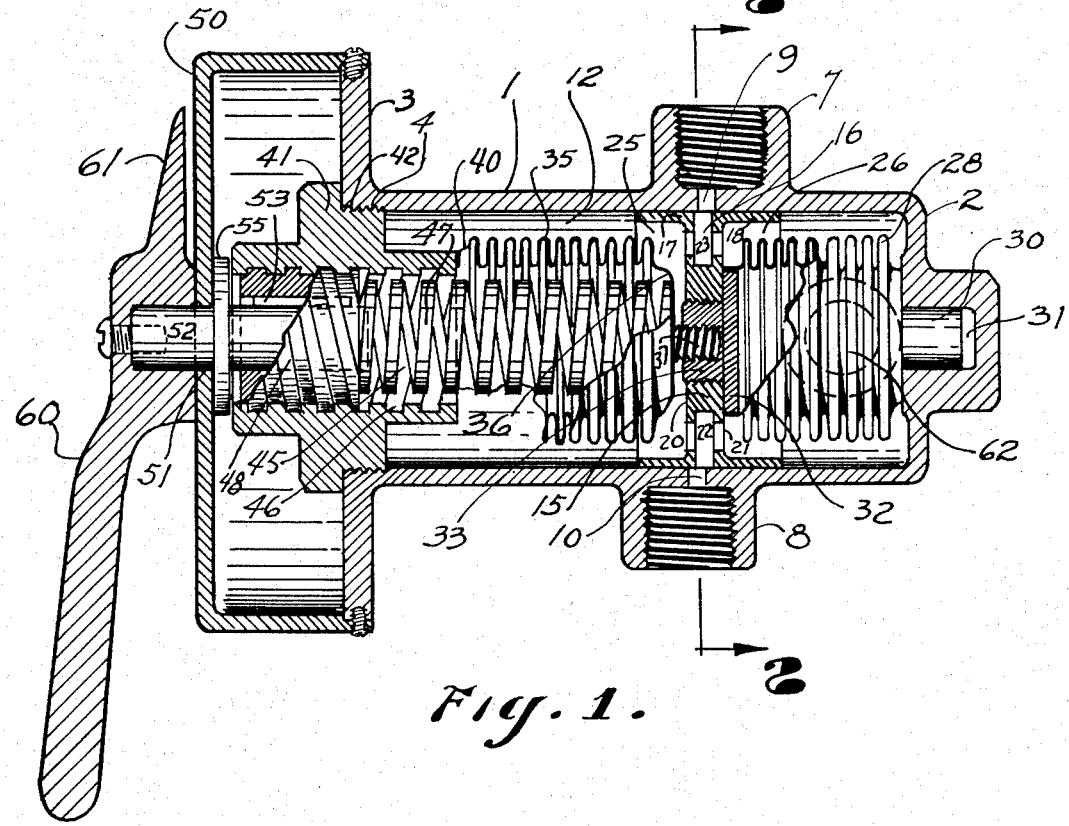

In the drawing, Fig. 1 shows a sectional view of the mixing valve. Fig. 2 is a section on 2—2 of Fig. 1.

The structure comprises an elongated cylindrical casting 1 having a closed end 2 and a flange 3 at the open end thereof. The open end is threaded at 4. Water inlets 7 and 8 are provided terminating in slot like apertures 9 and 10 giving access to the cylindrical interior 12. It will be noted that inlets 9 and 10 are staggered along the length of body 1 and are preferably disposed at opposite sides thereof.

Within cylinder 12 and normally between inlets 9 and 10 is a center member 15 of reduced diameter so disposed as to form an annular space 16 around it and within the cylindrical walls of body 1. Center member 15 carries a pair of cup shaped valve members 17 and 18 on opposite sides thereof with the open ends facing away from center member 15. The circular cups 17 and 18 are accurately finished outside to fit snugly within cylinder 12 in the region of ports 9 and 10. The bottoms 20 and 21 of the two cup-shaped valves are provided with a plurality of apertures 22 and 23 disposed near the edge thereof and giving access from annular region 16 to the interiors 25 and 26 of the cup valve members.

Rigidly carried by cup 18 on the inside thereof is a sealed bellows member 28 filled with an expansible gas such as sulphur dioxide or the like. Bellows 28 is disposed so that its axis is coincident with the axis of cylinder 12 and its diameter is smaller than that of the inside of cup 18 so that a clear free space around bellows 28 is formed. The free end of bellows 28 is provided with a filling plug 30 which is adapted to ride in a cylindrical cavity 31 in the bottom 2 of body 1.

Bellows 28 may carry at the cup end an end block 32 terminating in a cylindrical screw member 33 adapted to screw into center member 15. Hence bellows 28 may be readily replaced.

Disposed within cup 17 is another bellows 35 having its closed inner end 36 provided with a bolt 37 adapted to fit into a threaded aperture in screw member 33 to rigidly retain the same in place. The outer end 40 of bellows 35 is joined to a closure member 41 having a threaded portion 42 adapted to screw into threaded portion 4 of body 1. Closure member 41 is adapted to provide a water tight fit for cylinder 12 and with bellows 35 seals the inside of the bellows against water in cylinder 12.

Closure 41 has a central channel 45 with the interior surface provided with a coarse screw thread 46. Disposed within bellows 35 is a coil spring 47 with one end bearing against the inside end 36 of the bellows. The outer end of the spring bears against a screw 48 engaging threads 46 and movable lengthwise upon rotation to compress or release spring 47.

Carried by a flange 3 is a cupped face plate 50 having a central aperture at 51 through which projects a shaft 52 keyed to screw 48 at 53 to rotate therewith but permit screw 48 to move lengthwise freely. A retainer disk 55 rigidly carried by shaft 52 on the inside of cup plate 50 prevents shaft 52 from lengthwise movement. A handle 60 carrying a pointer 61 is rigidly attached to shaft 52 on the outside of cup 50.

Valve body 1 is provided with an outlet 62 disposed between end 2 and inlet ports 9 and 10 and preferably at right angles to the plane of the inlet ports. These inlet ports are preferably extended into grooves 66 and 67 along the inside of cylinder 12 and around the annular region 16.

In operation both bellows opposing each other neutralize the water pressure. The adjustment of coil spring 46 imposes a bias on bellows 28. Incoming water through ports 9 and 10 mix in region 16 and surround both bellows. The resultant temperature of the water around bellows 28 affects the position of the two cup members 17 and 18 and by the expansion and contraction of the bellows tend to adjust the inlet port openings so that a constant temperature at outlet 62 is maintained. Port 9 is for hot water and port 10 for cold water.

The grooves 66 and 67 on the inlet ports insure a thorough mixing of the hot and cold water.

It will be noted that the cylinder 12 need only be accurately ground near the inlet ports. Valve cups 17 and 18 are the only other members that required accurate finishing. Otherwise ordinary manufacturing tolerances are permissible. It is evident that the various parts may be readily replaced and that the entire structure is simple and cheap to manufacture and assemble.

What is claimed is:

1. A mixing valve comprising a casing having a cylindrical chamber therein open at one end only, inlet ports for hot and cold water communicating with said chamber, said ports being diametrically opposed to each other but staggered along the axis of the cylindrical chamber, an outlet port in a plane different from that containing the inlet ports and axially displaced with respect thereto toward the closed end of the chamber, a piston valve member comprising a central member having a diameter smaller than that of the chamber and adapted to form an annular region with the chamber wall, a cup shaped member at each end of said central member, each cup member snugly fitting said chamber with the hollow portion of each cup facing outwardly away from the central member, two bellows, each having one end rigidly fastened to each cup member within the hollow thereof, said bellows being small enough so that an annular space is formed between the inside cup walls and bellows, said cup members having their bottoms perforated to give free access for liquid around both bellows, the bellows at the closed end of the chamber being sealed and charged with an expansible gas, said piston valve member being so disposed that the annular region around the central member normally includes portions of both inlet ports when in use, but upon movement of said cup members axially, said cup members are adapted to control both port openings, said other bellows being provided with a threaded collar at the outer end which is adapted to engage the open end of said chamber and seal it and maintain the assembly therein, said collar having a threaded opening therethrough giving access to the interior of said bellows, a threaded sleeve within said collar opening and movable axially thereof upon rotation, a spring within said bellows adjustable upon movement of said sleeve to vary the expansive force of said bellows and manual means engaging said threaded sleeve to rotate the same.

2. The valve of claim 1 wherein said inlet ports terminate on the interior wall of said chamber in grooves having a substantially greater angular extent around said piston member than said ports.

3. The valve of claim 1 wherein said manual means includes a cover plate carrying a keying member adapted to co-act with the interior of said sleeve to rotatively engage the same but permit said sleeve to slide longitudinally thereof whereby said manual control remains in one plane at all times irrespective of sleeve movements.

HOWARD B. McLAUGHLIN.